F. W. MIDGLEY.
RECEIVING APPARATUS.
APPLICATION FILED MAR. 5, 1906. RENEWED SEPT. 30, 1910.
974,986.
Patented Nov. 8, 1910.
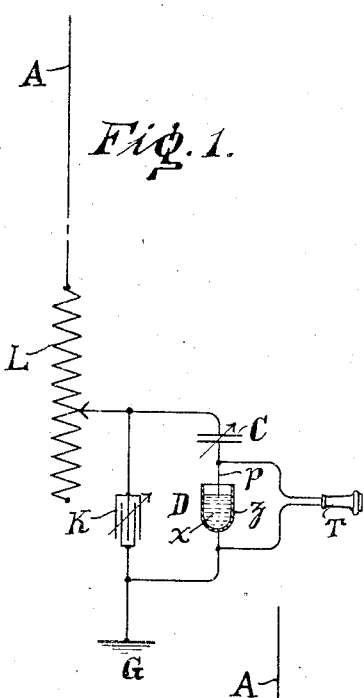
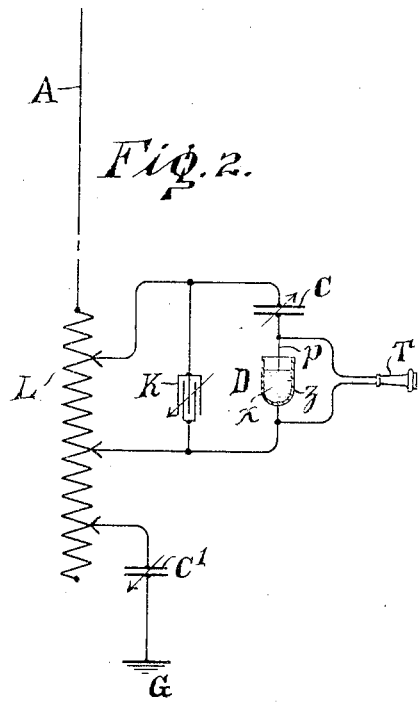
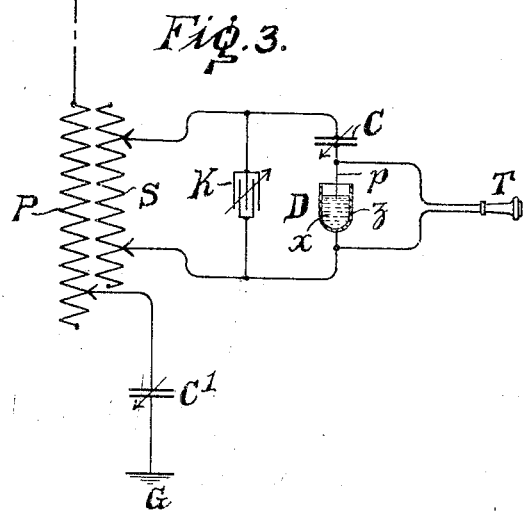

UNITED STATES PATENT OFFICE.

FREDERICK W. MIDGLEY, OF JERSEY CITY, NEW JERSEY, ASSIGNOR TO INTERNATIONAL TELEGRAPH CONSTRUCTION COMPANY, A CORPORATION OF NEW YORK.

RECEIVING APPARATUS.

974,986.  Specification of Letters Patent.  Patented Nov. 8, 1910.

Application filed March 5, 1906, Serial No. 304,218. Renewed September 30, 1910. Serial No. 584,785.

*To all whom it may concern:*

Be it known that I, FREDERICK W. MIDGLEY, a citizen of the United States, residing at Jersey City, in the county of Hudson and State of New Jersey, have invented a new and useful Receiving Apparatus, of which the following is a specification.

My invention relates to the receiving apparatus employed in signaling systems, and more especially those systems in which the signals or messages are represented during transmission by electro-radiant energy.

It is the object of my invention to render such receiving apparatus more efficient to the end that it shall respond to very weak arriving energy and to the further end that it shall be able to receive and indicate certain energy to the exclusion of other energy which may be existing in the natural media at the same time.

More particularly my invention resides in certain circuit arrangements comprising a condenser, the wave responsive device and another condenser being connected in shunt to said condenser, and all associated with an ordinary open aerial receiving conductor.

For illustration of several forms my invention may take reference is to be had to the accompanying drawings in which:

Figure 1 is a diagrammatic view showing a simple open or non-looped aerial conductor having associated therewith a condenser in shunt to which are connected a wave responsive device and a condenser, an adjustable inductance being included in the aerial circuit. Fig. 2 is a diagrammatic view showing the principal condenser connected in shunt to a portion of an inductance included in the aerial circuit. Fig. 3 is a diagrammatic view showing the principal condenser connected in the circuit of a secondary of a transformer.

Referring to Fig. 1, A is a simple open aerial conductor, not looped, which may consist of one or more wires or conductors held in an elevated position. Between it and the earth plate G, are serially connected the adjustable inductance L and the adjustable condenser K. A second condenser C, adjustable if desired, and the wave-responsive device D are connected serially with each other and in shunt to the condenser K.

D here represents a wave-responsive device such as the primary cell detector, comprising, for example, a zinc cup $z$ and a platinum terminal $p$ in contact with excitant $x$ in the cup, and connected in shunt thereto is the magneto telephone receiver T. In place of the magneto telephone T may be used a relay, a condenser telephone receiver, or any other signal translating device.

By first suitably adjusting the inductance L and the condenser K, and then adjusting condenser C, the apparatus is rendered highly selective and responsive to very weak received signal energy.

In Fig. 2, the adjustable inductance L is connected serially between the aerial conductor A and the earth plate G. An adjustable condenser C' may intervene or not, as desired, between the inductance L and the earth plate G. The condenser K is connected in shunt to a variable portion of the inductance L and in shunt to the condenser K are connected the condenser C and the wave-detector D. Signal translating instrument T is connected in shunt to the wave detector D. By suitably adjusting the riders on the inductance L, and suitably adjusting the condenser K, and by adjusting the condenser C', if present, highly selective reception of signals and reception of very weak signals is possible.

In Fig. 3, P is the primary of a transformer whose number of turns is adjustable by the rider, and between the lower terminal of the primary and the earth plate G may intervene or not, as desired, an adjustable condenser C'. S is the secondary of the transformer and connected in shunt to variable portions thereof is the adjustable condenser K, the remaining parts being connected as in the previous figures. This disposition of circuits and parts also produces sharp selectivity and the ability to receive extremely weak signals. It is to be understood that in Fig. 1, for example, the inductance may be entirely omitted and the condenser K be connected directly between aerial conductor A and the earth plate G.

What I claim is:

1. In a wireless signaling system, receiving apparatus comprising an open aerial conductor, a condenser associated therewith, a non-inductive circuit connected in shunt to said condenser, a wave responsive device and a tuning condenser serially connected with each other in said shunt circuit, and a circuit including only said wave-responsive device and signal translating means.

2. In a wireless signaling system, an open aerial conductor, an inductance and a condenser serially connected between said aerial conductor and earth, and a non-inductive circuit in shunt to said condenser and including a condenser and a wave-responsive device.

3. In a wireless signaling system, an aerial conductor, a condenser associated therewith, a circuit in shunt to said condenser including only a tuning condenser and a wave-responsive device, and a circuit including only said wave-responsive device and means for translating a signal.

4. In a wireless signaling system, an aerial conductor, an adjustable condenser associated therewith, a non-inductive circuit in shunt to said condenser including a wave-responsive device and an adjustable condenser, and a circuit including only said wave-responsive device and means for translating a signal.

5. In a wireless signaling system, an aerial conductor, an inductance associated therewith, an adjustable condenser associated with said inductance, a non-inductive circuit in shunt to said condenser including a wave-responsive device and an adjustable tuning condenser, and a circuit including only said wave-responsive device and means for translating a signal.

6. In a wireless signaling system, an open aerial conductor, an adjustable condenser connected between said aerial conductor and earth, a circuit in shunt to said condenser including only a wave-responsive device and an adjustable condenser, and a circuit including only said wave-responsive device and means for translating a signal.

7. In a wireless signaling system, an open aerial conductor, a condenser connected between said conductor and earth, a non-inductive circuit in shunt to said condenser including a wave-responsive device and a condenser, and a circuit including only said wave-responsive device and means for translating a signal.

8. In a wireless signaling system, an open aerial conductor, an adjustable inductance and an adjustable condenser serially connected between said conductor and earth, and a non-inductive circuit in shunt to said condenser including a wave-responsive device and an adjustable condenser.

9. In a wireless signaling system, an open aerial conductor, a condenser connected between said conductor and earth, and a non-inductive circuit in shunt to said condenser including an electro-chemical cell and a condenser, said cell constituting a wave-responsive device, and signal translating means connected in an untuned circuit in shunt to said cell.

10. In a wireless signaling system, an aerial conductor, a condenser associated therewith, a circuit in shunt to said condenser including a wave-responsive device and a tuning condenser of smaller capacity, and an untuned circuit in shunt to said wave-responsive device.

11. In a wireless signaling system, an aerial conductor, a single path between said conductor and earth, a condenser included in said single path, and a non-inductive circuit in shunt to said condenser including a second condenser and a wave-responsive device.

12. In a wireless signaling system, an aerial conductor, a single path between said conductor and earth, an associated condenser, and a non-inductive circuit in shunt to said condenser including a wave-responsive device and a tuning condenser serially connected.

13. In a wireless signaling system, an aerial conductor, a single path between said conductor and earth, an inductance included in said path, an associated condenser, and a non-inductive circuit connected in shunt to said condenser and including a tuning condenser and a wave-responsive device serially connected.

In testimony whereof I have hereunto affixed my signature in the presence of the two subscribing witnesses.

FRED'K W. MIDGLEY.

Witnesses:
M. F. CARROLL,
CHARLES A. FITZSIMMONS.